US012393335B2

(12) United States Patent
Dong et al.

(10) Patent No.: US 12,393,335 B2
(45) Date of Patent: Aug. 19, 2025

(54) UNCONFIGURED STORAGE APPLIANCE COMPATIBILITY CHECKING FOR A STORAGE CLUSTER

(71) Applicant: Dell Products L.P., Round Rock, TX (US)

(72) Inventors: Dazhi Dong, Shanghai (CN); Vasudevan Subramanian, Chapel Hill, NC (US); Joseph A. Perry, Sutton, MA (US)

(73) Assignee: Dell Products L.P., Round Rock, TX (US)

( * ) Notice: Subject to any disclaimer, the term of this patent is extended or adjusted under 35 U.S.C. 154(b) by 63 days.

(21) Appl. No.: 18/374,061

(22) Filed: Sep. 28, 2023

(65) Prior Publication Data

US 2025/0110639 A1 Apr. 3, 2025

(51) Int. Cl.
*G06F 3/06* (2006.01)

(52) U.S. Cl.
CPC .......... *G06F 3/0604* (2013.01); *G06F 3/0644* (2013.01); *G06F 3/067* (2013.01)

(58) Field of Classification Search
CPC ....... G06F 3/0604; G06F 3/0644; G06F 3/067
See application file for complete search history.

(56) References Cited

U.S. PATENT DOCUMENTS

| 8,990,798 | B2* | 3/2015 | Pohlmann | G06F 8/61 717/176 |
| 11,216,317 | B1* | 1/2022 | Shibayama | G06F 3/067 |
| 2017/0237773 | A1* | 8/2017 | Wallace | H04L 9/0643 726/22 |
| 2018/0287912 | A1* | 10/2018 | Zabarsky | H04L 41/12 |
| 2019/0370360 | A1 | 12/2019 | Mainali et al. | |
| 2021/0028987 | A1* | 1/2021 | Krivenok | H04L 41/0853 |
| 2021/0072917 | A1 | 3/2021 | Surla et al. | |

\* cited by examiner

*Primary Examiner* — Zhuo H Li
(74) *Attorney, Agent, or Firm* — BainwoodHuang

(57) ABSTRACT

Cluster management logic in a storage appliance of a storage cluster receives messages that are automatically transmitted periodically by unconfigured storage appliances. The unconfigured storage appliances do not belong to the storage cluster, and the messages contain properties of the unconfigured storage appliances. The messages may be multicast DNS (Domain Name Service) messages. The cluster management logic determines a level of compatibility of each one of the unconfigured storage appliances with regard to the storage cluster, based on the received properties. Determining the level of compatibility of each unconfigured storage appliance with the storage cluster may include assigning one of multiple compatibility level categories to each unconfigured storage appliance. The compatibility level categories may be or include a) incompatible, ii) compatible with warning, and/or c) compatible, and may be displayed in a graphical user interface that is used to add unconfigured storage appliances to the storage cluster.

17 Claims, 5 Drawing Sheets

```
discovered_appliances
[
  {
    ID: Storage_Appliance_X
    Compatibility:Incompatible
    Compatibility_Message: "This appliance cannot be added to the cluster because its minimum required software version v4.0.0.0 is higher than the cluster's software version v3.0.0.0."
  },
  {
    ID: Storage_Appliance_Y
    Compatibility:Compatible_withWarning
    Compatibility_Message: "This appliance can be added to the cluster, but the initiator limit for the cluster will be lowered to 2000, because this appliance has a 2000 initiator limit."
  },
  {
    ID: Storage_Appliance_Z
    Compatibility: Compatible
    Compatibility_Message: "This appliance can be added to the cluster."
  },
]
```

COMPATIBILITY STATUS REPORTING 342

UNCONFIGURED STORAGE APPLIANCE COMPATIBILITY CHECKING FOR A STORAGE CLUSTER

TECHNICAL FIELD

The present disclosure relates generally to managing the addition of storage appliances to a storage cluster.

BACKGROUND

Data storage appliances ("storage appliances") are arrangements of hardware and software that are coupled to non-volatile data storage drives, such as solid state drives and/or magnetic disk drives. The storage appliance services host I/O requests received from physical and/or virtual host machines ("hosts"). The host I/O requests received by the storage appliance specify host data that is written and/or read by the hosts. The storage appliance executes software that processes the host I/O requests by performing various data processing tasks to efficiently organize and persistently store the host data in the non-volatile data storage drives.

Multiple storage appliances can be organized into a storage cluster. Instead of connecting to individual storage appliances, in some storage clusters, hosts may establish logical connections with the storage cluster to obtain a data storage service from the cluster, e.g. a block-based data storage service or a file-based data storage service. Alternatively, in some storage clusters, a host may establish a physical connection with an individual storage appliance in the storage cluster having a specific block storage volume or file system. The storage cluster may dynamically determine which storage appliance or appliances in the storage cluster are used to service the host I/O requests it receives. The storage cluster may provide features such as fault tolerance, high data availability, load balancing, and/or high performance.

SUMMARY

In the disclosed technology, cluster management logic in a storage appliance belonging to a storage cluster receives messages automatically transmitted periodically by at least one unconfigured storage appliance. The at least one unconfigured storage appliance does not belong to the storage cluster, and the messages contain properties of the at least one unconfigured storage appliance. The cluster management logic determines, based on the properties of the at least one unconfigured storage appliance in the received messages, a level of compatibility of the at least one unconfigured storage appliance with the storage cluster.

In some embodiments, the at least one unconfigured storage appliance is made up of multiple unconfigured storage appliances, and the messages automatically transmitted periodically by the at least one unconfigured storage appliance are multicast Domain Name System (mDNS) messages that are periodically transmitted by each one of the multiple unconfigured storage appliances.

In some embodiments, the level of compatibility of the at least one unconfigured storage appliance with the storage cluster is determined by assigning one of multiple compatibility level categories to each one of the unconfigured storage appliances.

In some embodiments, the multiple compatibility level categories include i) a compatible category, ii) a compatible with warning category, and iii) an incompatible category. Assigning one of the compatibility level categories to each one of the plurality of unconfigured storage appliances includes i) assigning the compatible category to those ones of the unconfigured storage appliances that are fully compatible with the storage cluster, ii) assigning the compatible with warning category to those ones of the unconfigured storage appliances that are not fully compatible with the storage cluster but are sufficiently compatible with the storage cluster to be added to the storage cluster after presentation of a warning, and iii) assigning the incompatible category to those ones of the unconfigured storage appliances that are incompatible with the storage cluster.

In some embodiments, a representation of each one of the plurality of unconfigured storage appliances is displayed together with its assigned category in a graphical user interface.

In some embodiments, unconfigured storage appliances that are assigned to the compatible category are allowed to be joined to the storage cluster through the graphical user interface, unconfigured storage appliances that are assigned to the compatible with warning category are allowed to be joined to the storage cluster after presentation of the associated warning through the graphical user interface, and unconfigured storage appliances that are assigned to the incompatible category are prevented from being joined to the storage cluster through the graphical user interface.

In some embodiments, the properties include, for each one of the unconfigured storage appliances, a minimum required software version. In such embodiments, assigning the incompatible category to those ones of the unconfigured storage appliances that are incompatible with the storage cluster includes assigning the incompatible category to a first one of the unconfigured storage appliances in response to determining that a minimum required software version of the first one of the unconfigured storage appliances is greater than a current software version of the storage cluster.

In some embodiments, the properties further include, for each one of the unconfigured storage appliances, an operational limit of the unconfigured storage appliance with regard to instances of a managed object that may be created by that unconfigured storage appliance. In such embodiments, assigning the incompatible category to those ones of the unconfigured storage appliances that are incompatible with the storage cluster further includes assigning the incompatible category to a second one of the unconfigured storage appliances in response to determining that the operational limit of the second one of the unconfigured storage appliances is less than a total number of instances of the managed object previously created in the storage cluster.

In some embodiments, the properties further include, for each one of the unconfigured storage appliances, an appliance type of the unconfigured storage appliance. In such embodiments, assigning the compatible with warning category to those ones of the unconfigured storage appliances that are not fully compatible with the storage cluster but are sufficiently compatible with the storage cluster to be added to the storage cluster after presentation of a warning includes assigning the compatible with warning category to a third one of the unconfigured storage appliances in response to determining that both i) the minimum required software version of the third one of the unconfigured storage appliances is less than the current software version of the storage cluster, and ii) the appliance type of the third one of the unconfigured storage appliances is different from an appliance type of the storage cluster.

In some embodiments, assigning the compatible with warning category to those ones of the unconfigured storage appliances that are not fully compatible with the storage cluster but are sufficiently compatible with the storage cluster to be added to the storage cluster after presentation of a warning includes assigning the compatible with warning category to a fourth one of the unconfigured storage devices in response to determining that i) the operational limit of the fourth one of the unconfigured storage appliances with regard to a managed object is greater than the total number of instances of the managed object previously created in the storage cluster, and ii) the operational limit of the fourth one of the unconfigured storage appliances with regard to a managed object is less than an operational limit of the storage cluster with regard to the managed object.

In some embodiments, the associated warning indicates that the operational limit of the fourth one of the unconfigured storage appliances with regard to the managed object is less than the current operational limit of the storage cluster with regard to the managed object. In such embodiments, the operational limit of the storage cluster with regard to the managed object is lowered to match the operational limit of the fourth one of the unconfigured storage appliances in response to the fourth one of the unconfigured storage appliances being joined to the storage cluster.

In some embodiments, the properties further include, for each one of the unconfigured storage appliances, an appliance mode of the unconfigured storage appliance indicating a type of storage service or storage services that are supported by the storage appliance. In such embodiments, assigning the compatible category to those ones of the unconfigured storage appliances that are fully compatible with the storage cluster includes assigning the compatible category to a fifth one of the unconfigured storage appliances in response to determining that i) the minimum required software version of the fifth one of the unconfigured storage appliances is not greater than the current software version of the storage cluster, ii) the appliance type of the fifth one of the unconfigured storage appliances is the same as the appliance type of the storage cluster, and iii) the appliance mode of the fifth one of the unconfigured storage appliances is the same as an appliance mode of the storage cluster.

The disclosed technology is integral to providing a practical technical solution to the problem of determining storage cluster compatibility of unconfigured storage appliances prior to joining storage appliances to one or more storage clusters. Without the disclosed technology, the storage cluster must transmit its properties to each unconfigured storage appliance, and the unconfigured storage appliances must then run their own compatibility check code logic and provide a response that is transmitted back to the storage cluster, indicating whether each individual storage appliance can be joined to that individual storage cluster. Such operation would be inefficient, and require a storage cluster system administrator to individually initiate the compatibility check for each one of the unconfigured storage appliances. When there are large numbers of unconfigured storage appliances and storage clusters, large numbers of compatibility checks would have to be individually initiated on the unconfigured storage appliances, and the individual results must be monitored on a per-cluster basis, which is time consuming and inefficient.

In addition, without the disclosed technology, a storage cluster may be running a relatively older version of software, and as a result be unaware of relatively "new" hardware features. Under such circumstances, the storage cluster running the older version of software without the disclosed technology may not be able to check for such newer hardware features.

In addition, without the disclosed technology, the full impact of adding an unconfigured storage appliance to a storage cluster may not be known before the storage appliance is actually added to the storage cluster. Problems along these lines may arise in systems lacking the disclosed technology when a storage appliance having a relatively lower operational limit for a managed object is added to a storage cluster with a relatively higher operational limit for the managed object, without the knowledge of the system administrator. In another example, without the disclosed technology, an unconfigured appliance may be added to a storage cluster even though the added storage appliance has a different front-end I/O module from that being used by storage appliances already joined to the storage cluster.

Furthermore, individual unconfigured storage appliances may have different optional cards installed in them (e.g. low-power data processing units (DPU), interface cards, etc.). A system administrator may desire to create storage clusters that specifically include storage appliances having the same optional cards, or that include storage appliances having different optional cards. Embodiments of the disclosed technology may advantageously expose the presence or absence of such optional cards in the unconfigured storage appliances prior to the joining of the unconfigured storage appliances to a specific storage cluster.

The foregoing summary does not indicate required elements, or otherwise limit the embodiments of the disclosed technology described herein. The technical features described herein can be combined in any specific manner, and all combinations may be used to embody the disclosed technology.

BRIEF DESCRIPTION OF THE DRAWINGS

The objects, features and advantages of the disclosed technology will be apparent from the following description of embodiments, as illustrated in the accompanying drawings in which like reference numbers refer to the same parts throughout the different views. The drawings are not necessarily to scale, emphasis instead being placed on illustrating the principles of the disclosed technology.

FIG. 3 is a diagram showing an example of compatibility status reporting information in some embodiments;

DETAILED DESCRIPTION

Figure 1:
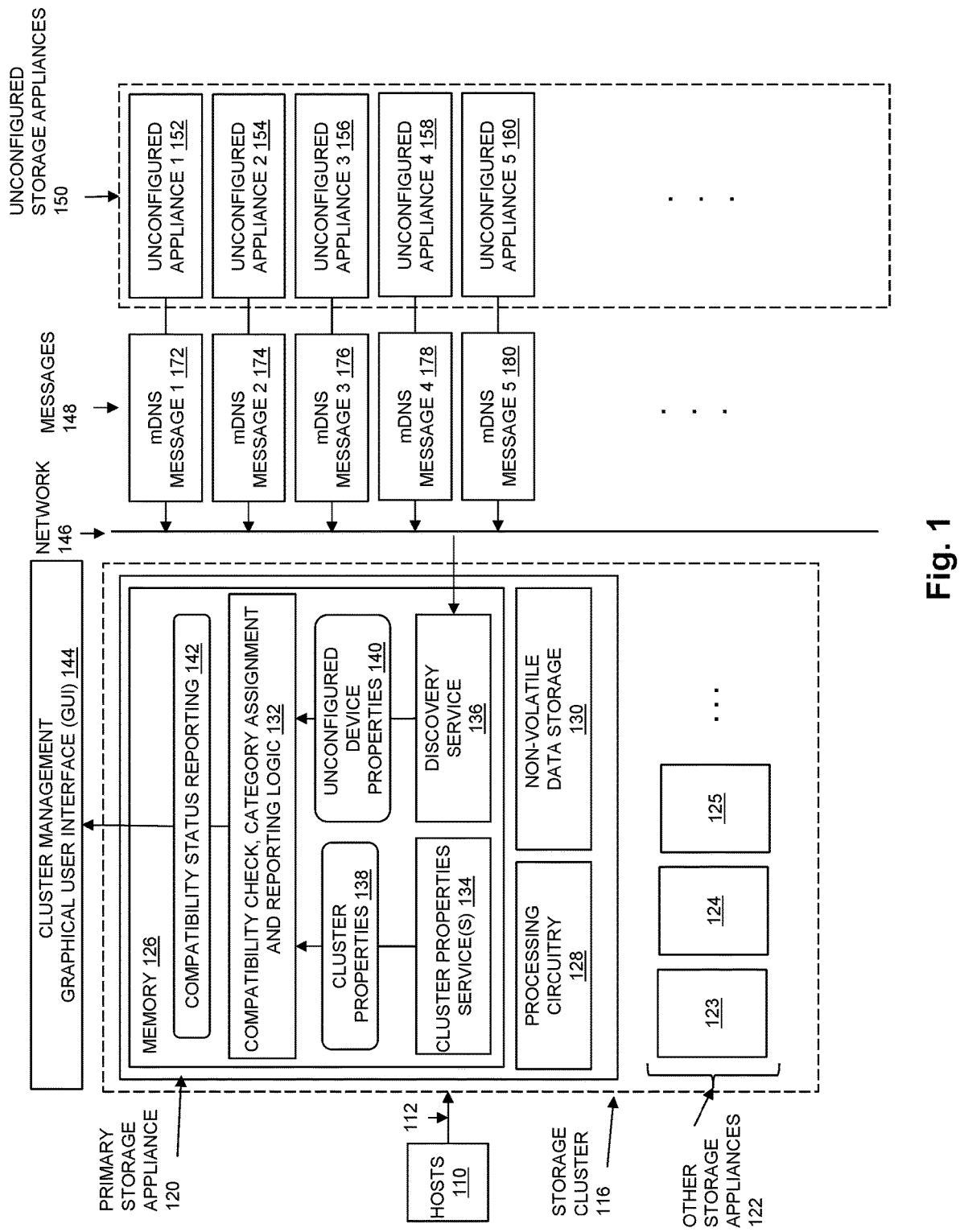
FIG. 1 is a block diagram showing components of an illustrative embodiment of the disclosed technology.

Embodiments will now be described with reference to the figures. The embodiments described herein are not limiting, and are provided only as examples, in order to illustrate various features and principles of the disclosed technology. The embodiments of disclosed technology described herein are integrated into a practical solution for determining storage cluster compatibility of unconfigured storage appliances prior to joining storage appliances to one or more storage clusters.

Cluster management logic in a storage appliance belonging to a storage cluster receives messages automatically transmitted periodically by at least one unconfigured storage appliance. The at least one unconfigured storage appliance does not belong to the storage cluster, and the messages contain properties of the at least one unconfigured storage appliance. The cluster management logic determines, based on the properties of the at least one unconfigured storage appliance in the received messages and properties of the storage cluster, a level of compatibility of the at least one unconfigured storage appliance with the storage cluster.

The at least one unconfigured storage appliance may be multiple unconfigured storage appliances, and the messages automatically transmitted periodically by the at least one unconfigured storage appliance may be multicast Domain Name System (mDNS) messages that are periodically transmitted by each one of the multiple unconfigured storage appliances.

The level of compatibility of the at least one unconfigured storage appliance with the storage cluster comprises may be determined by assigning one of multiple compatibility level categories to each one of the unconfigured storage appliances.

The multiple compatibility level categories may include i) a compatible category, ii) a compatible with warning category, and iii) an incompatible category. Assigning one of the plurality of compatibility level categories to each one of the plurality of unconfigured storage appliances may include i) assigning the compatible category to those ones of the unconfigured storage appliances that are fully compatible with the storage cluster, ii) assigning the compatible with warning category to those ones of the unconfigured storage appliances that are not fully compatible with the storage cluster but are sufficiently compatible with the storage cluster to be added to the storage cluster after presentation of a warning, and iii) assigning the incompatible category to those ones of the unconfigured storage appliances that are incompatible with the storage cluster.

A representation of each one of the plurality of unconfigured storage appliances may be displayed together with its assigned category and one or more of its properties within a graphical user interface.

Unconfigured storage appliances that are assigned to the compatible category are allowed to be joined to the storage cluster through the graphical user interface, unconfigured storage appliances that are assigned to the compatible with warning category are allowed to be joined to the storage cluster after presentation of the warning through the graphical user interface, and unconfigured storage appliances that are assigned to the incompatible category are prevented from being joined to the storage cluster through the graphical user interface.

The properties may include, for each one of the unconfigured storage appliances, a minimum required software version. Assigning the incompatible category to those ones of the unconfigured storage appliances that are incompatible with the storage cluster includes assigning the incompatible category to a first one of the unconfigured storage appliances in response to determining that a minimum required software version of the first one of the unconfigured storage appliances is greater than a current software version of the storage cluster.

The properties may further include, for each one of the unconfigured storage appliances, an operational limit of the unconfigured storage appliance with regard to instances of a managed object that may be created by that unconfigured storage appliance. Assigning the incompatible category to those ones of the unconfigured storage appliances that are incompatible with the storage cluster may further include assigning the incompatible category to a second one of the unconfigured storage appliances in response to determining that the operational limit of the second one of the unconfigured storage appliances is less than a total number of instances of the managed object previously created in the storage cluster.

The properties may further include, for each one of the unconfigured storage appliances, an appliance type of the unconfigured storage appliance. Assigning the compatible with warning category to those ones of the unconfigured storage appliances that are not fully compatible with the storage cluster but are sufficiently compatible with the storage cluster to be added to the storage cluster after presentation of a warning may include assigning the compatible with warning category to a third one of the unconfigured storage appliances in response to determining that both i) the minimum required software version of the third one of the unconfigured storage appliances is less than the current software version of the storage cluster, and ii) the appliance type of the third one of the unconfigured storage appliances is different from an appliance type of the storage cluster.

Assigning the compatible with warning category to those ones of the unconfigured storage appliances that are not fully compatible with the storage cluster but are sufficiently compatible with the storage cluster to be added to the storage cluster after presentation of a warning may include assigning the compatible with warning category to a fourth one of the unconfigured storage devices in response to determining that i) the operational limit of the fourth one of the unconfigured storage appliances with regard to a managed object is greater than the total number of instances of the managed object previously created in the storage cluster, and ii) the operational limit of the fourth one of the unconfigured storage appliances with regard to a managed object is less than an operational limit of the storage cluster with regard to the managed object.

The associated warning may indicate that the operational limit of the fourth one of the unconfigured storage appliances with regard to the managed object is less than the current operational limit of the storage cluster with regard to the managed object. The operational limit of the storage cluster with regard to the managed object may be lowered to match the operational limit of the fourth one of the unconfigured storage appliances in response to the fourth one of the unconfigured storage appliances being joined to the storage cluster.

The properties may further include, for each one of the unconfigured storage appliances, an appliance mode of the unconfigured storage appliance indicating a type of storage service supported by the storage appliance. Assigning the compatible category to those ones of the unconfigured storage appliances that are fully compatible with the storage cluster may include assigning the compatible category to a fifth one of the unconfigured storage appliances in response to determining that i) the minimum required software version of the fifth one of the unconfigured storage appliances is not greater than the current software version of the storage cluster, ii) the appliance type of the fifth one of the unconfigured storage appliances is the same as the appliance type of the storage cluster, and iii) the appliance mode of the fifth one of the unconfigured storage appliances is the same as an appliance mode of the storage cluster.

FIG. 1 is a block diagram showing an operational environment for the disclosed technology, including an example embodiment of the disclosed technology. FIG. 1 shows a number of physical and/or virtual host computing devices, referred to as "hosts", and shown for purposes of illustration by Hosts 110. The hosts and/or applications executing thereon access non-volatile data storage provided by Storage Cluster 116, for example over one or more networks, such as a local area network (LAN), and/or a wide area network (WAN) such as the Internet, etc. Alternatively, Hosts 110 and/or applications accessing non-volatile data storage provided by Storage Cluster 116 may execute within Storage Cluster 116.

Storage Cluster 116 includes multiple storage appliances that belong to Storage Cluster 116. In the example of FIG. 1, Storage Cluster 116 includes Primary Storage Appliance 120, and some number of Other Storage Appliances 122, shown including storage appliances 123, 124, 125, etc. In some embodiments, Hosts 110 may establish logical connections (e.g. SCSI connections) with Storage Cluster 116 to obtain a data storage service from the cluster, e.g. a block-based data storage service and/or a file-based data storage service. In other embodiments, individual ones of Hosts 110 may establish physical connections with individual storage appliances in Storage Cluster 116 that have specific block storage volumes or file systems. Storage cluster logic (e.g. executing in Primary Storage Appliance 120) may determine a specific storage appliance or appliances in Storage Cluster 116 that are used to service host I/O requests received from Hosts 110 (e.g. I/O read requests and I/O write requests). Storage Cluster 116 may provide features such as fault tolerance, high data availability, load balancing, and/or high performance.

Storage Cluster 116 supports a block-based (aka "block level") data storage service to one or more of the Hosts 110. A block-based data storage service processes block-based I/O requests received from Hosts 110. Block-based I/O requests processed by Storage Cluster 116 enable Hosts 110 to indicate blocks of host data to be written to and read from the non-volatile data storage served by Storage Cluster 116. Block-based I/O requests may be communicated to Storage Cluster 116 by Hosts 110 using a block-based storage protocol, and Hosts 110 connect to Data Storage System 116 using a block-based data storage protocol. Examples of block-based data storage protocols that may be supported by Storage Cluster 116 include without limitation Fibre Channel (FC), Internet Small Computer Systems Interface (iSCSI), and/or Non-Volatile Memory Express (NVMe) protocols.

Storage Cluster 116 may also support a file-level data storage service. In the case where Storage Cluster 116 also supports a file-level data storage service, Storage Cluster 116 processes file-based I/O requests received by Data Storage System 116 from Hosts 110. File-based I/O requests received by Storage Cluster 116 from Hosts 110 access files that are served by Storage Cluster 116 to the Hosts 110, that are stored in the non-volatile data storage of Storage Cluster 116. In the case where Storage Cluster 116 supports a file-level data storage service, Storage Cluster 116 may act as Network Attached Storage (NAS) for the Hosts 110. The file-based I/O requests may be communicated to Storage Cluster 116 by Hosts 110 using a file-based storage protocol such as Network File System (NFS) and/or Server Message Block (SMB).

Each one of the storage appliances in Storage Cluster 116 includes or has access to non-volatile data storage that is used to store host data received from Hosts 110. For example, Primary Storage Appliance 120 is shown including Non-Volatile Data Storage 130. Non-Volatile Data Storage 130 may include physical data storage drives such as solid state drives, magnetic disk drives, hybrid drives, optical drives, and/or other specific types of drives.

Each one of the storage processors in Storage Cluster 116 also includes memory and processing circuitry. For example, Primary Storage Appliance 120 is shown including a Memory 126 that stores program code that executes on Processing Circuitry 128, as well as data generated and/or processed by such program code. Memory 126 may include volatile memory (e.g. RAM), and/or other types of memory. Processing Circuitry 128 may include or consist of one or more processor cores that independently execute instructions.

Processing Circuitry 124 and Memory 126 together form control circuitry that is configured and arranged to carry out various methods and functions described herein. The Memory 126 stores a variety of software components that may be provided in the form of executable program code, including Compatibility Check, Category Assignment and Reporting Logic 132, Cluster Properties Service(s) 134, and Discovery Service 136. When the program code stored in Memory 126 is executed by Processing Circuitry 124, Processing Circuitry 124 is caused to carry out the operations of the software components described herein. Although certain software components are shown in the Figures and described herein for purposes of illustration and explanation, those skilled in the art will recognize that Memory 126 may also include various other specific types of software components.

During operation of the illustrative example of FIG. 1, cluster management logic in Primary Storage Appliance 120 receives messages automatically transmitted periodically by at least one unconfigured storage appliance in Unconfigured Storage Appliances 150. The cluster management logic in Primary Storage Appliance 120 may include Compatibility Check, Category Assignment and Reporting Logic 132, Discovery Service 136, Cluster Properties Service(s) 134, and/or other program code executing in Primary Storage Appliance. The messages received by the cluster management logic in Primary Storage Appliance 120 may include one or more of Messages 148. In the example of FIG. 1, the Messages 148 are received by Discovery Service 136, and Compatibility Check, Category Assignment, and Reporting Logic 132 obtains the properties of Unconfigured Storage Appliances 150 from Discovery Service 136, as shown by Unconfigured Device Properties 140.

Unconfigured Storage Appliances 150 are storage appliances that have been discovered on Network 146, e.g. by Discovery Service 136. Discovery of Unconfigured Storage Appliances 150 by Discovery Service 136 may include or consist of receipt of Messages 148 by Discovery Service 136. The unconfigured appliances in Unconfigured Storage Appliances 150 do not belong to Storage Cluster 116.

Figure 2:
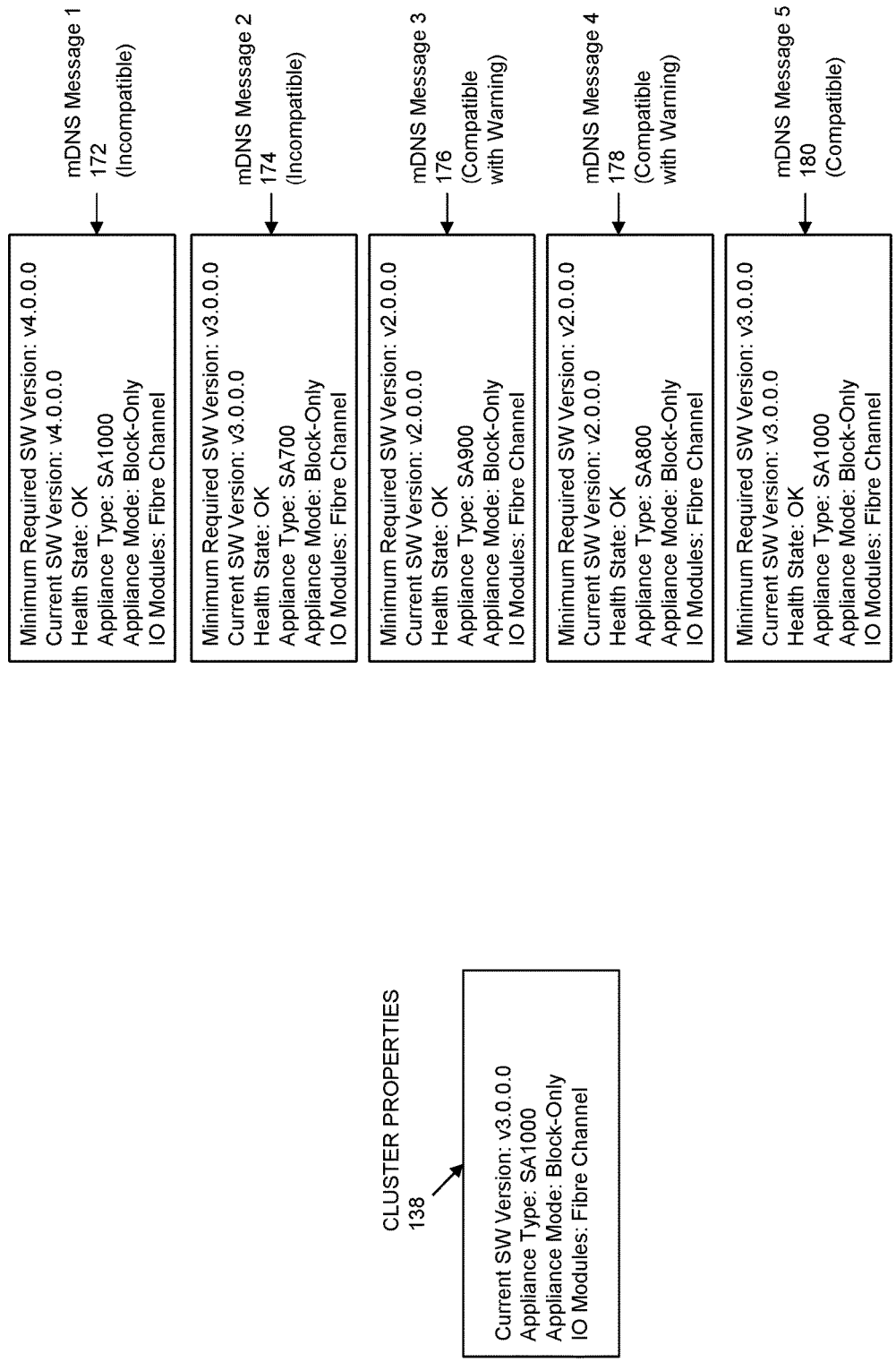
FIG. 2 is a block diagram showing an example of storage cluster properties and unconfigured storage appliance properties for the illustrative embodiment of FIG. 1.

Each one of the messages in Messages 148 contains properties of the unconfigured storage appliance that transmitted the message. Accordingly, Message 1 172 contains properties of Unconfigured Storage Appliance 1 152, Message 2 174 contains properties of Unconfigured Storage Appliance 2 154, Message 3 176 contains properties of Unconfigured Storage Appliance 3 156, Message 4 178 contains properties of Unconfigured Storage Appliance 4 158, and Message 5 180 contains properties of Unconfigured Storage Appliance 5 160. Examples of specific properties contained in individual ones of the Messages 148 are shown in FIG. 2.

For each one of the messages in Messages 148, the cluster management logic in Primary Storage Appliance 120 determines, based on the properties contained in the message and Cluster Properties 138 of Storage Cluster 116, a level of compatibility of the unconfigured storage appliance that transmitted the message with Storage Cluster 116. For example, Compatibility Check, Category Assignment and Reporting Logic 132 may obtain Cluster Properties 138 using Cluster Properties Service(s) 134. Some or all of the Cluster Properties 138 may reflect the components and/or capabilities of Primary Storage Appliance 120. Cluster Properties Service(s) 134 may accordingly obtain Cluster Properties 138 at least in part by examining the current configuration and/or components of Primary Storage Appliance 120. Compatibility Check, Category Assignment and Reporting Logic 132 may compare the properties of each one of the unconfigured storage appliances, as provided in the message transmitted from that unconfigured storage appliance, with Cluster Properties 138. Based on the comparison, Compatibility Check, Category Assignment and Reporting Logic 132 determines the level of compatibility between the unconfigured storage appliance and Storage Cluster 116.

The at least one unconfigured storage appliance that transmits Messages 148 may be multiple unconfigured storage appliances. In the example of FIG. 1, Unconfigured Storage Appliances 150 includes at least Unconfigured Appliance 1 152, Unconfigured Appliance 2 154, Unconfigured Appliance 3, 156, Unconfigured Appliance 4 158, and Unconfigured Appliance 5. The Messages 148 automatically transmitted periodically by each one of the Unconfigured Storage Appliances 150 may be multicast Domain Name System (mDNS) messages that are periodically transmitted by each one of the Unconfigured Storage Appliances 150. In the example of FIG. 1, Message 1 172 is an mDNS service information message automatically periodically transmitted by mDNS logic executing in Unconfigured Storage Appliance 1 152, Message 2 174 is an mDNS service information message automatically periodically transmitted by mDNS logic executing Unconfigured Storage Appliance 2 154, Message 3 176 is an mDNS service information message automatically periodically transmitted by mDNS logic executing in Unconfigured Storage Appliance 3 156, Message 4 178 is an mDNS service information message automatically periodically transmitted by mDNS logic executing in Unconfigured Storage Appliance 4 158, and Message 5 180 is an mDNS service information message automatically periodically transmitted by mDNS logic executing in Unconfigured Storage Appliance 5 160.

For each unconfigured storage appliance in Unconfigured Storage Appliances 150, Compatibility Check, Category Assignment, and Reporting Logic 132 may, based on a comparison of the properties of that unconfigured storage appliance to Cluster Properties 138, determine the level of compatibility of that unconfigured storage appliance with Storage Cluster 116 by assigning one of multiple compatibility level categories to the unconfigured storage appliance. The multiple compatibility level categories may include i) a compatible category, ii) a compatible with warning category, and iii) an incompatible category. Assigning, by Compatibility Check, Category Assignment, and Reporting Logic 132, one of the multiple compatibility level categories to each one of the unconfigured storage appliances in Unconfigured Storage Appliances 150 may include i) assigning the compatible category to those ones of Unconfigured Storage Appliances 150 that are fully compatible with Storage Cluster 116, ii) assigning the compatible with warning category to those ones of Unconfigured Storage Appliances 150 that are not fully compatible with Storage Cluster 116 but are sufficiently compatible with Storage Cluster 116 to be added to Storage Cluster 116 after presentation of a warning, and iii) assigning the incompatible category to those ones of Unconfigured Storage Appliances 116 that are incompatible with Storage Cluster 116.

A representation of each one of the unconfigured storage appliances in Unconfigured Storage Appliances 150 may be displayed in Cluster Management Graphical User Interface (GUI) 144. Cluster Management GUI 144 may be displayed on a display device of a system administrator's computer, a display device of Primary Storage Appliance 120, or another display device. The representation of each unconfigured storage appliance may include or be displayed together with some or all of the properties of that unconfigured storage appliance. In addition, the representation of each unconfigured storage appliance in the Cluster Management GUI 144 may include or be displayed together with the compatibility level category assigned to that unconfigured storage appliance. In the example of FIG. 1, Compatibility Check, Category Assignment and Reporting Logic 132 generates Compatibility Status Reporting 142, which contains properties and/or the assigned compatibility level category for one or more of the unconfigured storage appliances in Unconfigured Storage Appliances 150, for display through Cluster Management GUI 144. An example of Compatibility Status Reporting 142 is shown in FIG. 3. In some embodiments, Compatibility Status Reporting 142 may be provided as an output to Cluster Management GUI 144, through a REST (Representational State Transfer) API (Application Programming Interface) in Compatibility Check, Category Assignment and Reporting Logic 132. In addition, the REST API may further be employed to allow the user to access functionality in the cluster management logic through Cluster Management GUI 144, e.g. functionality in Compatibility Check, Category Assignment and Reporting Logic 132 that controls whether the user can cause one or more specific ones of the unconfigured storage appliances can be joined to the Storage Cluster 116, through the Cluster Management GUI 144, based on the assigned compatibility level categories.

Compatibility Check, Category Assignment and Reporting Logic 132 allows those of the unconfigured storage appliances in Unconfigured Storage Appliances 150 that are assigned to the compatible category to be joined to Storage Cluster 116 through Cluster Management GUI 144. Compatibility Check, Category Assignment and Reporting Logic 132 allows those of the unconfigured storage appliances in Unconfigured Storage Appliances 150 that are assigned to the compatible with warning category to be joined to Storage Cluster 116 through Cluster Management GUI 144 after a warning is displayed through Cluster Management GUI 144. Compatibility Check, Category Assignment and Reporting Logic 132 prevents those of the unconfigured storage appliances in Unconfigured Storage Appliances 150 that are assigned to the incompatible category from being joined to the storage cluster through Cluster Management GUI 144.

For each one of the unconfigured storage appliances in Unconfigured Storage Appliances 150, the properties included in the corresponding message in Messages 148 may include a minimum software version that is required by that storage appliance. In the example of FIG. 1, Compatibility Check, Category Assignment and Reporting Logic 132 assigns the incompatible category to those ones of the unconfigured storage appliances in Unconfigured Storage Appliances 150 that are incompatible with the storage cluster at least in part by assigning the incompatible category to Unconfigured Appliance 1 152 in response to determining that the minimum required software version of Unconfigured Appliance 1 152 is greater than a current software version of Storage Cluster 116. For example, as shown in FIG. 2, mDNS Message 1 172 may contain properties indicating that the minimum required software version ("Minimum Required SW Version") for Unconfigured Appliance 1 152 is v4.0.0.0, and the Cluster Properties 138 may contain properties indicating that the current software version ("Current SW Version") of Storage Cluster 116 is v3.0.0.0. In this case, Compatibility Check, Category Assignment and Reporting Logic 132 determines that the minimum required software version of Unconfigured Appliance 1 152 is greater than the current software version of Storage Cluster 116, and accordingly assigns the incompatible category to Unconfigured Appliance 1 152 and prevents Unconfigured Appliance 1 152 from being joined to Storage Cluster 116.

For each one of the unconfigured storage appliances in Unconfigured Storage Appliances 150, the properties included in the corresponding message in Messages 148 may include an operational limit of that storage appliance with regard to a managed object. The managed object may be any specific type of storage object for which an operational limit may be set, and operational limits may be set for a variety of different types of storage objects. For example, each one of the unconfigured storage appliances in Unconfigured Storage Appliances 150 may have an operational limit that is a maximum number of initiator objects that may be created by that storage appliance, based on the specific type of storage appliance. Each initiator object instance that is created represents a host initiator that can send host I/O requests to the storage appliance, and the maximum number of initiator objects that may be created by a storage appliance is a limit on the number of host initiators that may connect to and send host I/O requests to that storage appliance. Different types of storage appliances have different limits on the maximum number of initiator objects that they may create. For example, a first type of storage appliance (e.g. "SA1000" storage appliances) may have a maximum limit of 4000 initiator objects, and a second type of storage appliance (e.g. "SA900" storage appliances) may also have a maximum limit of 4000 initiator objects, while a third type of storage appliance (e.g. "SA800" storage appliances) may have a maximum limit of 2000 initiator objects, and a fourth type of storage appliance (e.g. "SA700" storage appliances) may have a maximum limit of 1000 initiator objects. Accordingly, the operational limit property for any one of the unconfigured appliances with regard to a maximum limit on initiator objects for that storage appliance is also the appliance type property of that storage appliance, since the operational limit of the storage appliance is determined based on the appliance type of the storage appliance. Those skilled in the art will recognize that the appliance types used herein ("SA1000", "SA900", "SA800", etc.) are provided only for purposes of explanation, and the disclosed technology may be embodied using any specific appliance types.

The maximum limit of initiator objects for a storage cluster is the lowest maximum limit on initiator objects of any individual storage appliance across all the storage appliances that currently belong to the cluster. For example, in the case of the Storage Cluster 116, since each storage appliance in the storage cluster must be capable of servicing host I/O requests from each one of the host initiators that have connected to Storage Cluster 116, and must accordingly be capable of creating an initiator object for each such host initiator, the maximum limit on initiator objects for Storage Cluster 116 is the lowest maximum limit on initiator objects of any one of the storage appliances that have been joined to Storage Cluster 116, i.e. the lowest maximum initiator object limit of any one of Primary Storage Appliance 120 and the storage appliances in Other Storage Appliances 122. For example, in the case where all of the storage appliances that currently belong to Storage Cluster 116 are SA1000 type storage appliances, the maximum limit on initiator objects for Storage Cluster 116 is 4000 initiator objects. At any given time, the current number of initiator objects that have previously been created by the Storage Cluster 116 is the number of host initiators that have previously established connections with Storage Cluster 116, and that can accordingly send host I/O requests to Storage Cluster 116.

In the example of FIG. 1, Compatibility Check, Category Assignment and Reporting Logic 132 assigns the incompatible category to those ones of the unconfigured storage appliances in Unconfigured Storage Appliances 150 that are incompatible with the storage cluster at least in part by assigning the incompatible category to Unconfigured Appliance 2 154 in response to determining that Unconfigured Appliance 2, 154 has an operational limit with regard to initiator objects that is lower than the total number of initiator objects that have previously been created in Storage Cluster 116. For example, as shown in FIG. 2, mDNS Message 2 174 may contain properties indicating that Unconfigured Appliance 2 154 is an SA700 type storage appliance, and thus has a maximum limit of 1000 initiator objects. In the case where the total number of initiator objects that have previously been created in Storage Cluster is 1500, the maximum number of initiator objects for Unconfigured Appliance 2 154 is less than the total number of initiator objects that have previously been created in Storage Cluster 116, causing Compatibility Check, Category Assignment and Reporting Logic 132 to assign the incompatible category to Unconfigured Appliance 2 154, and to prevent Unconfigured Appliance 2 154 from being joined to Storage Cluster 116.

As referred to above, for each one of the unconfigured storage appliances in Unconfigured Storage Appliances 150, the properties included in the corresponding message in Messages 148 may include an appliance type of that storage appliance. In the example of FIG. 1, Compatibility Check, Category Assignment and Reporting Logic 132 assigns the compatible with warning category to those ones of the unconfigured storage appliances in Unconfigured Storage Appliances 150 that are sufficiently compatible with Storage Cluster 116 to be added to Storage Cluster 116 after presentation of a warning at least in part by assigning the compatible with warning category to Unconfigured Appliance 3 156 in response to determining that Unconfigured Appliance 3 156 has both i) a minimum required software version that less than the current software version of Storage Cluster 116, and ii) an appliance type that is different from an appliance type of Storage Cluster 116. For example, as shown in FIG. 2, mDNS Message 3 176 may contain properties indicating that i) the minimum required software version of Unconfigured Appliance 3 156 is v2.0.0.0, which is less than the current software version of Storage Cluster 116 (e.g. v3.0.0.0), and ii) that the appliance type of Unconfigured Appliance 3 156 is SA900, which is different from the appliance type of Storage Cluster 116 (e.g. SA1000). In some embodiments, for example, the appliance type of Storage Cluster 116 may be provided by Cluster Properties Service(s) 134 as the appliance type of the Primary Storage Appliance 120. In this case, Compatibility Check, Category Assignment and Reporting Logic 132 determines that i) a minimum required software version of Unconfigured Appliance 3 156 is less than the current software version of Storage Cluster 116, and ii) the appliance type of Unconfigured Appliance 3 156 is different from the appliance type of Storage Cluster 116. Compatibility Check, Category Assignment and Reporting Logic 132 accordingly assigns the compatible with warning category to Unconfigured Appliance 3 156. As a result, Compatibility Check, Category Assignment and Reporting Logic 132 only allows Unconfigured Appliance 3 156 to be joined to Storage Cluster 116 after presentation of a warning indicating that the minimum required software version of Unconfigured Appliance 3 156 is less than the current software version of Storage Cluster 116, and that the appliance type of Unconfigured Appliance 3 156 is different from the appliance type of Storage Cluster 116.

Further in the example of FIG. 1, Compatibility Check, Category Assignment and Reporting Logic 132 assigns the compatible with warning category to those ones of the unconfigured storage appliances in Unconfigured Storage Appliances 150 that are sufficiently compatible with Storage Cluster 116 to be added to Storage Cluster 116 after presentation of a warning at least in part by assigning the compatible with warning category to Unconfigured Appliance 4 158 in response to determining that Unconfigured Appliance 4 158 i) has an operational limit with regard to a managed object that is greater than the total number of instances of the managed object previously created in Storage Cluster 116, and ii) has an operational limit with regard to the managed object that is less than the operational limit of Storage Cluster 116 with regard to the managed object. For example, as shown in FIG. 2, mDNS Message 4 178 may contain properties indicating that Unconfigured Appliance 4 158 i) has an appliance type of SA800, which has a maximum limit on initiator objects of 2000, which is greater than the total number of initiator objects that have previously been created in Storage Cluster 116 (e.g. 1500), and ii) has a maximum limit on initiator objects (e.g. 2000) that is less than the maximum limit on initiator objects of Storage Cluster 116 (e.g. 4000 because the appliance types of all storage appliances in Storage Cluster 116 is currently SA1000). Compatibility Check, Category Assignment and Reporting Logic 132 accordingly assigns the compatible with warning category to Unconfigured Appliance 4 158. As a result, Compatibility Check, Category Assignment and Reporting Logic 132 only allows Unconfigured Appliance 4 158 to be joined to Storage Cluster 116 after presentation of a warning indicating that the maximum limit on initiator objects for Unconfigured Appliance 4 158 is less than the current maximum limit on initiator objects for Storage Cluster 116, and that if Unconfigured Appliance 4 158 is joined to Storage Cluster 116, the maximum limit on initiator objects for Storage Cluster 116 will be lowered to 2000. In response to Unconfigured Appliance 4 158 being joined to Storage Cluster 116, Compatibility Check, Category Assignment and Reporting Logic 132 will lower the maximum limit on initiator objects for Storage Cluster 116 to the maximum limit on initiator objects for Unconfigured Appliance 4 158, i.e. 2000.

For each one of the unconfigured storage appliances in Unconfigured Storage Appliances 150, the properties included in the corresponding message in Messages 148 may include an appliance mode of that storage appliance, indicating the type of storage service(s) supported by the storage appliance. For example, each storage appliance may support either i) only block-based data storage service, or ii) both block-based and file-based data storage services. In the case where the storage appliance supports only block-based data storage service, the appliance mode of the storage appliance is "Block-Only". In the case where the storage appliance supports both block-based and file-based data storage services, the appliance mode of the storage appliance is "Block-and-File". In the example of FIG. 1, Compatibility Check, Category Assignment and Reporting Logic 132 assigns the compatible category to those ones of the unconfigured storage appliances in Unconfigured Storage Appliances 150 that are fully compatible with Storage Cluster 116 at least in part by assigning the compatible category to Unconfigured Appliance 5 160 in response to determining that i) the minimum required software version of Unconfigured Appliance 5 160 is not greater than the current software version of Storage Cluster 116, ii) the appliance type of Unconfigured Appliance 5 160 is the same as the appliance type of Storage Cluster 116, and iii) the appliance mode of Unconfigured Appliance 5 160 is the same as the appliance mode of Storage Cluster 116. For example, as shown in FIG. 2, mDNS Message 5 180 may contain properties indicating that i) the minimum required software version of Unconfigured Appliance 5 160 is v3.0.0.0, which is not greater than the current software version of Storage Cluster 116 (e.g. v3.0.0.0), ii) the appliance type of Unconfigured Appliance 5 160 is SA1000, which is the same as the appliance type of Storage Cluster 116 (e.g. SA1000), and iii) the appliance mode of Unconfigured Appliance 5 160 is Block-Only, which is the same as the appliance mode of Storage Cluster 116 (e.g. Block-Only). Compatibility Check, Category Assignment and Reporting Logic 132 accordingly assigns the compatible category to Unconfigured Appliance 5 160. As a result, Compatibility Check, Category Assignment and Reporting Logic 132 allows Unconfigured Appliance 5 160 to be joined to Storage Cluster 116.

FIG. 3 is a diagram showing an example of compatibility status reporting information generated in some embodiments. In the Compatibility Status Reporting 342 shown in FIG. 3, an indication is provided that a discovered unconfigured storage appliance Storage Appliance X has been assigned to the incompatible category. Compatibility Status Reporting 342 also includes a message that is to be displayed in the cluster management GUI, indicating why Storage Appliance X has been assigned to the incompatible category, i.e. "This appliance cannot be added to the cluster because its minimum required software version v4.0.0.0 is higher than the cluster's software version v3.0.0.0".

Also in the Compatibility Status Reporting 342 shown in FIG. 3, an indication is provided that a discovered unconfigured storage appliance Storage Appliance Y has been assigned to the compatible with warning category. Compatibility Status Reporting 342 also includes a message that is to be displayed in the cluster management GUI prior to Storage Appliance Y being permitted to join the storage cluster, i.e. "This appliance can be added to the cluster, but the initiator limit for the cluster will be lowered to 2000, because this appliance has a 2000 initiator limit".

Further in the Compatibility Status Reporting 342 shown in FIG. 3, an indication is provided that a discovered unconfigured appliance Storage Appliance Z has been assigned to the compatible category. Compatibility Status Reporting 342 also includes a message that is to be displayed in the cluster management GUI indicating that Storage Appliance Z can be joined to the storage cluster, i.e. "This appliance can be added to the cluster."

Figure 4:
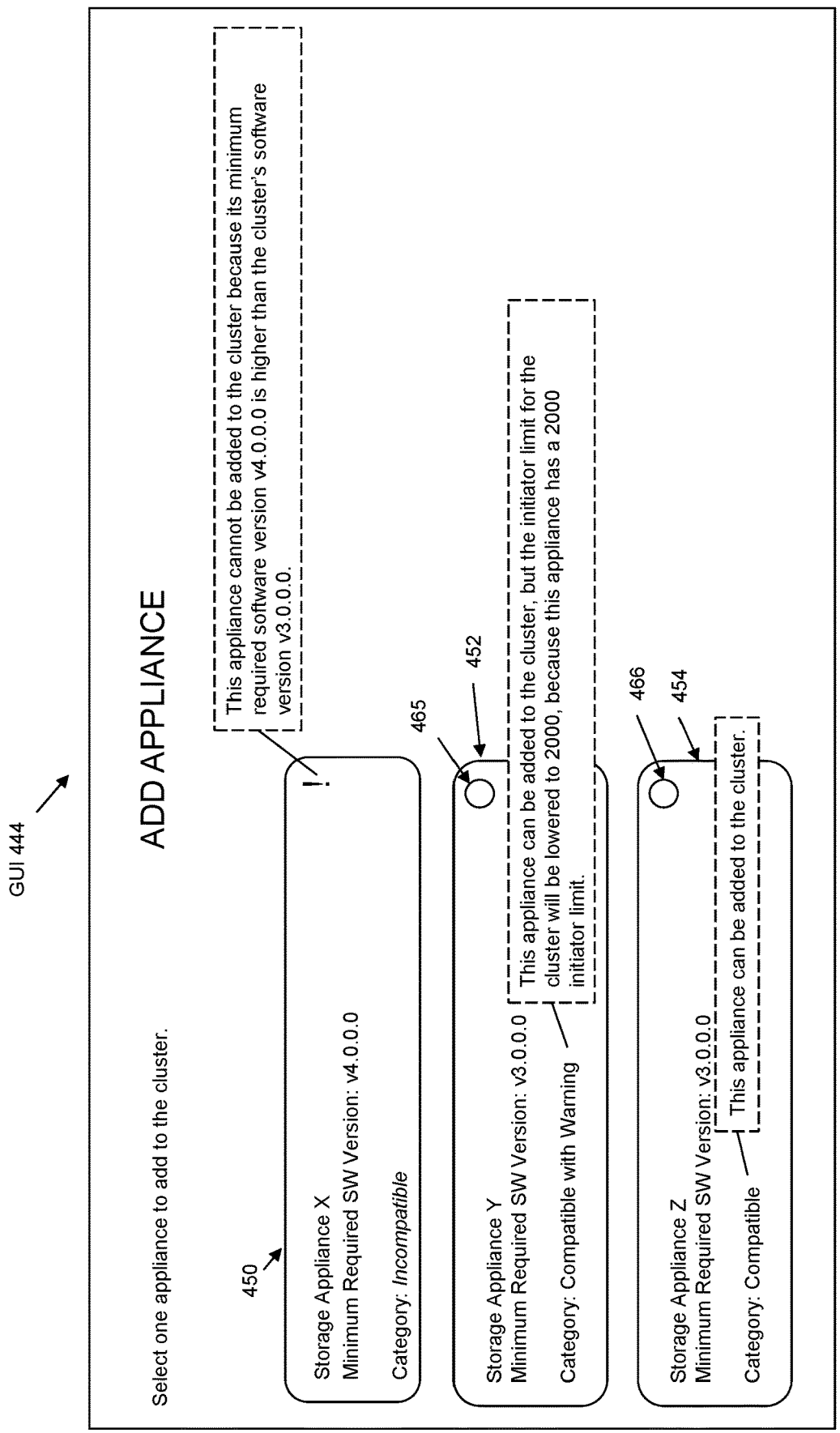
FIG. 4 is a block diagram showing an example of a graphical user interface as may be generated in some embodiments.

FIG. 4 is a block diagram showing an example of a cluster management GUI generated in some embodiments. In the example of FIG. 4, a representation 450 of the discovered unconfigured storage appliance Storage Appliance X presents one or more of the properties of Storage Appliance X, e.g. by displaying that the minimum required software version for Storage Appliance X is v4.0.0.0. The representation 450 of Storage Appliance X additionally presents the category assigned to Storage Appliance X, e.g. by displaying the "Incompatible" category. The representation 450 of Storage Appliance X prevents Storage Appliance X from being added to the storage cluster (e.g. because the representation of Storage Appliance X is displayed without a radio button that would allow Storage Appliance X to be selected), and displays a message to that effect, e.g. "This appliance cannot be added to the cluster because its minimum required software version v4.0.0.0 is higher than the cluster's software version v3.0.0.0."

A representation 452 of the discovered unconfigured storage appliance Storage Appliance Y presents one or more of the properties of Storage Appliance Y, e.g. by displaying that the minimum required software version for Storage Appliance Y is v3.0.0.0. The representation 452 of Storage Appliance Y additionally presents the category assigned to Storage Appliance Y, e.g. by displaying the "Compatible with Warning" category. The representation 452 of Storage Appliance Y allows Storage Appliance Y to be added to the storage cluster after display of an associated warning, by first displaying the warning "This appliance can be added to the cluster, but the initiator limit for the cluster will be lowered to 2000, because this appliance has a 2000 initiator limit", prior to allowing Storage Appliance Y to be added to the storage cluster. For example, Storage Appliance Y is allowed to be added to the storage cluster by display of the radio button 465, which enables the user to select Storage Appliance Y by clicking on the radio button 465 after display of the associated warning.

A representation 454 of the discovered unconfigured storage appliance Storage Appliance Z presents one or more of the properties of Storage Appliance Z, e.g. by displaying that the minimum required software version for Storage Appliance Z is v3.0.0.0. The representation 454 of Storage Appliance Z additionally presents the category assigned to Storage Appliance Z, e.g. by displaying the "Compatible" category. The representation 454 of Storage Appliance Z allows Storage Appliance Z to be added to the storage cluster, and displays of the message "This appliance can be added to the cluster." For example, Storage Appliance Z is allowed to be added to the storage cluster by display of radio button 466, which enables Storage Appliance Z to be added to the storage cluster by the user selecting Storage Appliance Z by clicking on the radio button 466.

Figure 5:
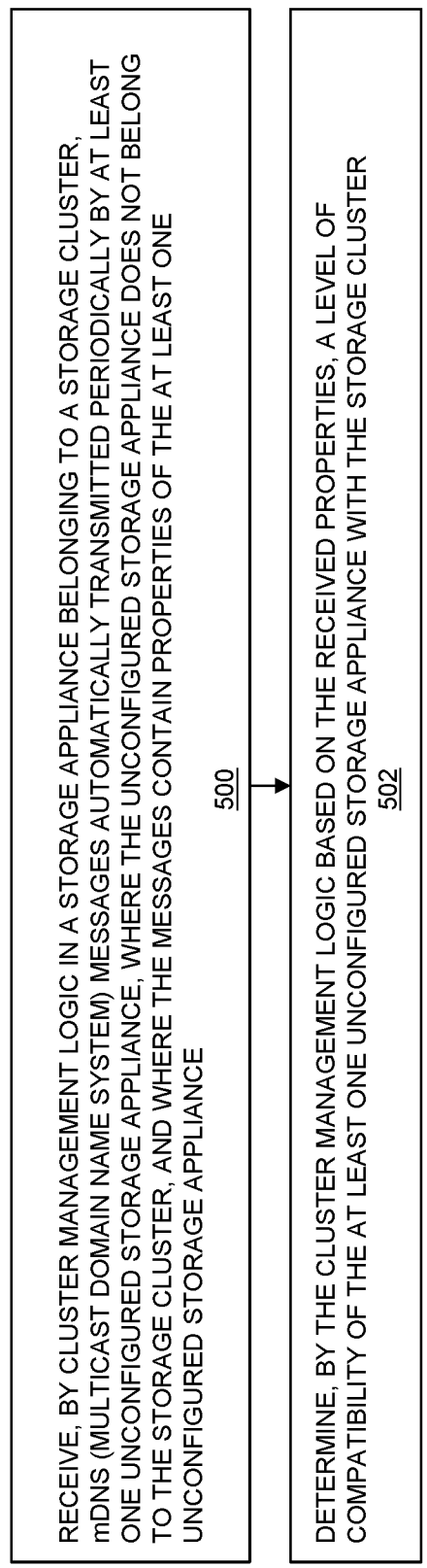
FIG. 5 is a flow chart showing an example of steps performed in some embodiments.

FIG. 5 is a flow chart showing an example of steps performed in some embodiments.

At step 500, cluster management logic in a storage appliance belonging to a storage cluster receives mDNS (multicast Domain Name System) messages automatically transmitted periodically by at least one unconfigured storage appliance. The unconfigured storage appliance does not belong to the storage cluster, and the messages contain properties of the at least one unconfigured storage appliance.

At step 502, the cluster management logic determines, based on the received properties, a level of compatibility of the at least one unconfigured storage appliance with the storage cluster.

As will be appreciated by those skilled in the art, aspects of the technology disclosed herein may be embodied as a system, method, or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto programmable data processing apparatus to produce a machine, such that the instructions which execute on the programmable data processing apparatus create means for implementing the functions specified in the block or blocks. These computer program instructions may also be stored in a computer-readable memory that can direct a programmable data processing apparatus to function in a particular manner, such that the instructions stored in the computer-readable memory produce an article of manufacture including instruction means which implement the function specified in the block or blocks. The computer program instructions may also be loaded onto a programmable data processing apparatus to cause a series of operational steps to be performed on the programmable apparatus to produce a computer implemented process such that the instructions which execute on the programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method comprising:
receiving, by cluster management logic in a storage appliance belonging to a storage cluster, messages automatically transmitted periodically by a plurality of unconfigured storage appliances, wherein the plurality of unconfigured storage appliances do not belong to the storage cluster, wherein the messages comprise multicast Domain Name System (mDNS) messages periodically transmitted by each one of the plurality of unconfigured storage appliances, and wherein the messages contain properties of the plurality of unconfigured storage appliances; and determining, by the cluster management logic based on the properties of the plurality of unconfigured storage appliances in the received messages, a level of compatibility of the plurality of unconfigured storage appliances with the storage cluster, whereby compatibility of the plurality of unconfigured storage appliances with the storage cluster is determined prior to joining the plurality of unconfigured storage appliances to the storage cluster.

2. The method of claim 1, wherein determining the level of compatibility of the plurality of storage appliances with the storage cluster comprises assigning one of a plurality of compatibility level categories to each one of the plurality of unconfigured storage appliances.

3. The method of claim 2, wherein the plurality of compatibility level categories includes i) a compatible category, ii) a compatible with warning category, and iii) an incompatible category, and wherein assigning one of the plurality of compatibility level categories to each one of the plurality of unconfigured storage appliances comprises:

assigning the compatible category to those ones of the plurality of unconfigured storage appliances that are fully compatible with the storage cluster;

assigning the compatible with warning category to those ones of the plurality of unconfigured storage appliances that are not fully compatible with the storage cluster but are sufficiently compatible with the storage cluster to be added to the storage cluster after presentation of a warning; and assigning the incompatible category to those ones of the plurality of unconfigured storage appliances that are incompatible with the storage cluster.

4. The method of claim 3, further comprising:
displaying a representation of each one of the plurality of unconfigured storage appliances together with its assigned category in a user interface.

5. The method of claim 4, further comprising:
allowing unconfigured storage appliances in the plurality of unconfigured appliances that are assigned to the compatible category to be joined to the storage cluster through the user interface;

allowing unconfigured storage appliances in the plurality of unconfigured appliances that are assigned to the compatible with warning category to be joined to the storage cluster after presentation of the associated warning through the user interface; and preventing unconfigured storage appliances in the plurality of unconfigured appliances that are assigned to the incompatible category from being joined to the storage cluster through the user interface.

6. The method of claim 5, wherein the properties include, for each one of the plurality of unconfigured storage appliances, a minimum required software version; and wherein assigning the incompatible category to those ones of the plurality of unconfigured storage appliances that are incompatible with the storage cluster includes assigning the incompatible category to a first one of the plurality of unconfigured storage appliances in response to determining that a minimum required software version of the first one of the plurality of unconfigured storage appliances is greater than a current software version of the storage cluster.

7. The method of claim 6, wherein the properties further include, for each one of the plurality of unconfigured storage appliances, an operational limit of the unconfigured storage appliance with regard to instances of a managed object that may be created by that unconfigured appliance; and wherein assigning the incompatible category to those ones of the plurality of unconfigured storage appliances that are incompatible with the storage cluster further includes assigning the incompatible category to a second one of the plurality of unconfigured storage appliances in response to determining that the operational limit of the second one of the plurality of unconfigured storage appliances is less than a total number of instances of the managed object previously created in the storage cluster.

8. The method of claim 7, wherein the properties further include, for each one of the plurality of unconfigured storage appliances, an appliance type of the unconfigured storage appliance; and wherein assigning the compatible with warning category to those ones of the plurality of unconfigured storage appliances that are not fully compatible with the storage cluster but are sufficiently compatible with the storage cluster to be added to the storage cluster after presentation of a warning includes assigning the compatible with warning category to a third one of the plurality of unconfigured storage appliances in response to determining that both i) the minimum required software version of the third one of the plurality of unconfigured storage appliances is less than the current software version of the storage cluster, and ii) the appliance type of the third one of the plurality of unconfigured storage appliances is different from an appliance type of the storage cluster.

9. The method of claim 8, wherein assigning the compatible with warning category to those ones of the plurality of unconfigured storage appliances that are not fully compatible with the storage cluster but are sufficiently compatible with the storage cluster to be added to the storage cluster after presentation of a warning includes assigning the compatible with warning category to a fourth one of the plurality of unconfigured storage devices in response to determining that i) the operational limit of the fourth one of the unconfigured storage appliances with regard to a managed object is greater than the total number of instances of the managed object previously created in the storage cluster, and ii) the operational limit of the fourth one of the plurality of unconfigured storage appliances with regard to a managed object is less than an operational limit of the storage cluster with regard to the managed object.

10. The method of claim 9, wherein the associated warning indicates that the operational limit of the fourth one of the plurality of unconfigured storage appliances with regard to the managed object is less than the operational limit of the storage cluster with regard to the managed object; and lowering the operational limit of the storage cluster with regard to the managed object to match the operational limit of the fourth one of the plurality of unconfigured storage appliances in response to the fourth one of the plurality of unconfigured storage appliances being joined to the storage cluster.

11. The method of claim 10, wherein the properties further include, for each one of the plurality of unconfigured storage appliances, an appliance mode of the unconfigured storage appliance indicating a type of storage service supported by the storage appliance; and wherein assigning the compatible category to those ones of the plurality of unconfigured storage appliances that are not fully compatible with the storage cluster includes assigning the compatible category to a fifth one of the plurality of unconfigured storage appliances in response to determining that i) the minimum required software version of the fifth one of the plurality of unconfigured storage appliances is not greater than the current software version of the storage cluster, ii) the appliance type of the fifth one of the plurality of unconfigured storage appliances is the same as the appliance type of the storage cluster, and iii) the appliance mode of the fifth one of the plurality of unconfigured storage appliances is the same as an appliance mode of the storage cluster.

12. A system comprising:

processing circuitry and a memory;

non-volatile data storage; and wherein the memory has program code stored thereon, wherein the program code, when executed by the processing circuitry, causes the processing circuitry to:

receive, by cluster management logic in a storage appliance belonging to a storage cluster, messages automatically transmitted periodically by a plurality of unconfigured storage appliances, wherein the plurality of unconfigured storage appliances do not belong to the storage cluster, wherein the messages comprise multicast Domain Name System (mDNS) messages periodically transmitted by each one of the plurality of unconfigured storage appliances, and wherein the messages contain properties of the plurality of unconfigured storage appliances; and determine, by the cluster management logic based on the properties of the plurality of unconfigured storage appliances in the received messages, a level of compatibility of the plurality of unconfigured storage appliances with the storage cluster, whereby compatibility of the plurality of unconfigured storage appliances with the storage cluster is determined prior to joining the plurality of unconfigured storage appliances to the storage cluster.

13. The system of claim 12, wherein the level of compatibility of the plurality of unconfigured storage appliances with the storage cluster comprises is determined by assignment of one of a plurality of compatibility level categories to each one of the plurality of unconfigured storage appliances.

14. The system of claim 13, wherein the plurality of compatibility level categories includes i) a compatible category, ii) a compatible with warning category, and iii) an incompatible category, and wherein assignment of one of the plurality of compatibility level categories to each one of the plurality of unconfigured storage appliances comprises:

assignment of the compatible category to those ones of the plurality of unconfigured storage appliances that are fully compatible with the storage cluster;

assignment of the compatible with warning category to those ones of the plurality of unconfigured storage appliances that are not fully compatible with the storage cluster but are sufficiently compatible with the storage cluster to be added to the storage cluster after presentation of a warning; and assignment of the incompatible category to those ones of the plurality of unconfigured storage appliances that are incompatible with the storage cluster.

15. The system of claim 14, wherein the program code, when executed by the processing circuitry, further causes the processing circuitry to:

display a representation of each one of the plurality of unconfigured storage appliances together with its assigned category in a user interface.

16. The system of claim 15, wherein the program code, when executed by the processing circuitry, further causes the processing circuitry to:

allow unconfigured storage appliances in the plurality of unconfigured appliances that are assigned to the compatible category to be joined to the storage cluster through the user interface;

allow unconfigured storage appliances in the plurality of unconfigured appliances that are assigned to the compatible with warning category to be joined to the storage cluster after presentation of the associated warning through the user interface; and prevent unconfigured storage appliances in the plurality of unconfigured appliances that are assigned to the incompatible category from being joined to the storage cluster through the user interface.

17. A computer program product including a non-transitory computer readable medium having instructions stored thereon, wherein the instructions, when executed on processing circuitry, cause the processing circuitry to perform steps including:

receiving, by cluster management logic in a storage appliance belonging to a storage cluster, messages automatically transmitted periodically by a plurality of unconfigured storage appliances, wherein the plurality of unconfigured storage appliances do not belong to the storage cluster, wherein the messages comprise multicast Domain Name System (mDNS) messages periodically transmitted by each one of the plurality of unconfigured storage appliances, and wherein the messages contain properties of the plurality of unconfigured storage appliances; and determining, by the cluster management logic based on the properties of the plurality of unconfigured storage appliances in the received messages, a level of compatibility of the plurality of unconfigured storage appliances with the storage cluster, whereby compatibility of the plurality of unconfigured storage appliances with the storage cluster is determined prior to joining the plurality of unconfigured storage appliances to the storage cluster.

* * * * *